May 8, 1951  C. S. ASH  2,552,082
VEHICLE WHEEL
Filed March 20, 1947  4 Sheets-Sheet 2
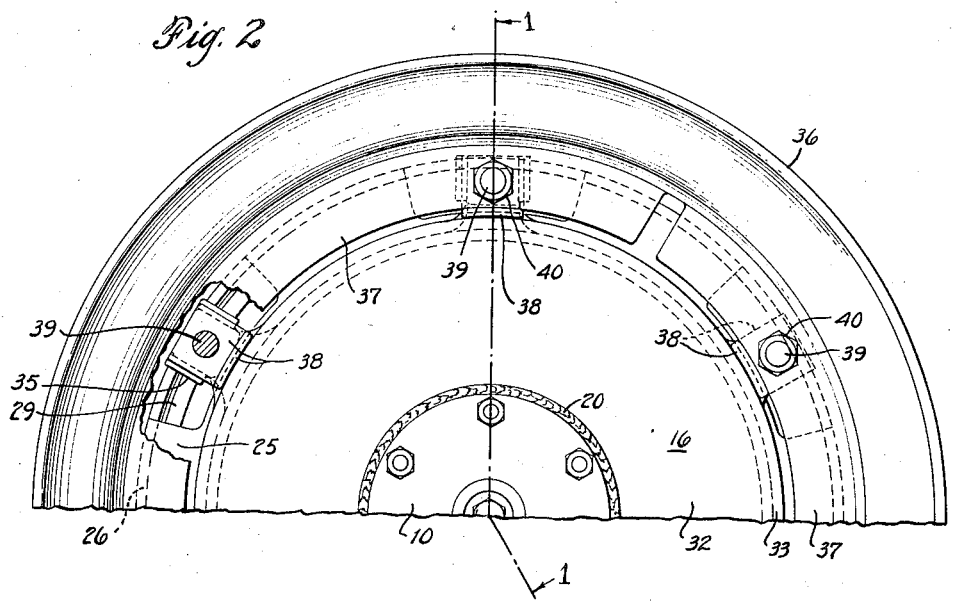
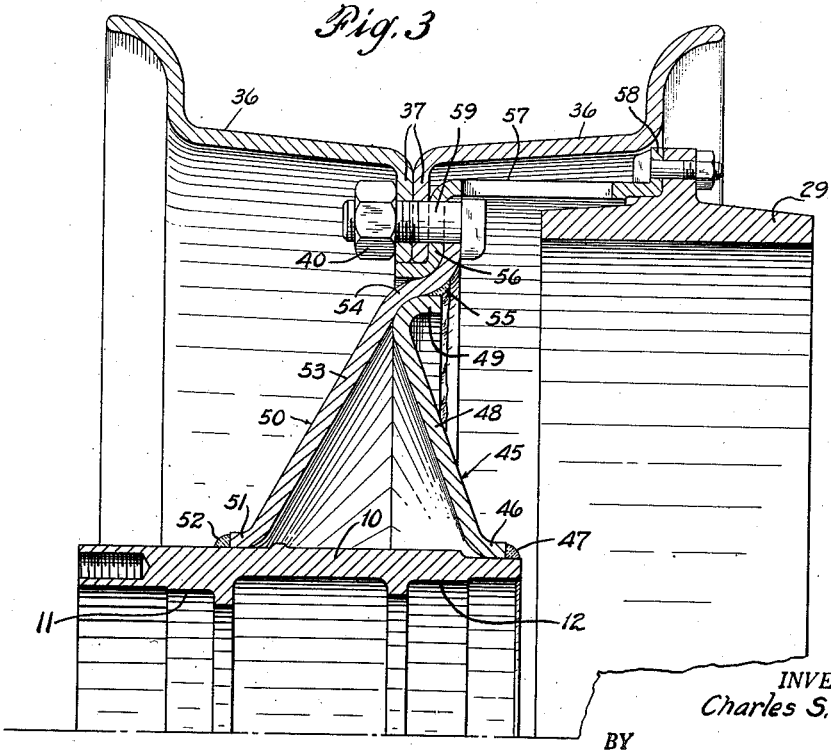
INVENTOR.
Charles S. Ash
BY
Morgan, Finnegan & Durkan
ATTORNEYS.

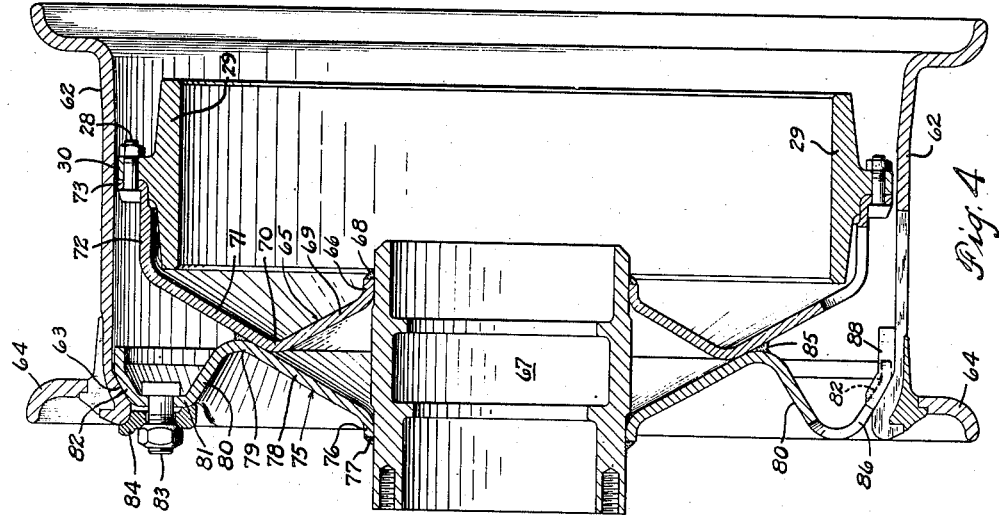

May 8, 1951

C. S. ASH 2,552,082

VEHICLE WHEEL

Filed March 20, 1947

INVENTOR.
Charles S. Ash
BY
Morgan, Finnegan & Durham
ATTORNEYS

Patented May 8, 1951

2,552,082

UNITED STATES PATENT OFFICE 2,552,082

VEHICLE WHEEL

Charles S. Ash, Milford, Mich.

Application March 20, 1947, Serial No. 735,949

4 Claims. (Cl. 301—6)

The present invention relates to an improved vehicle wheel.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 2 is a side elevation of the wheel shown in Fig. 1 viewed from the outboard side of the wheel;

Fig. 3 is a cross-sectional view of a modified embodiment of the invention;

Fig. 4 is a cross-sectional view of a further embodiment of the invention;

Fig. 5 is a side elevation of the wheel shown in Fig. 4 viewed from the outboard side of the wheel;

It is an object of the present invention to provide an improved vehicle wheel, economical to construct and sturdy and well balanced in its finished form. Another object is the provision of a vehicle wheel easily fabricated of relatively small and easily formed elements and assembled into a finished, fabricated wheel including braking means therefor. The wheel of the present invention affords the foregoing advantages in a vehicle wheel of the demountable rim type. In one of its embodiments the invention provides a wheel with an improved split rim construction, and in another embodiment a wheel is provided to receive a conventional wedge type of demountable rim. Still another object is the provision of a fabricated vehicle wheel particularly adapted to heavy duty, single tire uses, and further adapted for use with large cross section tires using rims of relatively wide channel and relatively small diameter. The wheel of the present invention in its various embodiments is particularly adapted for use on a vehicle having equally loaded axles and may be used interchangeably upon front or rear axles, at either side of the vehicle. In such a vehicle it is necessary to provide the same braking efficiency and the same load capacity bearings in the wheels for both front and rear axles, and the present invention provides a wheel of these characteristics.

Figure 1:
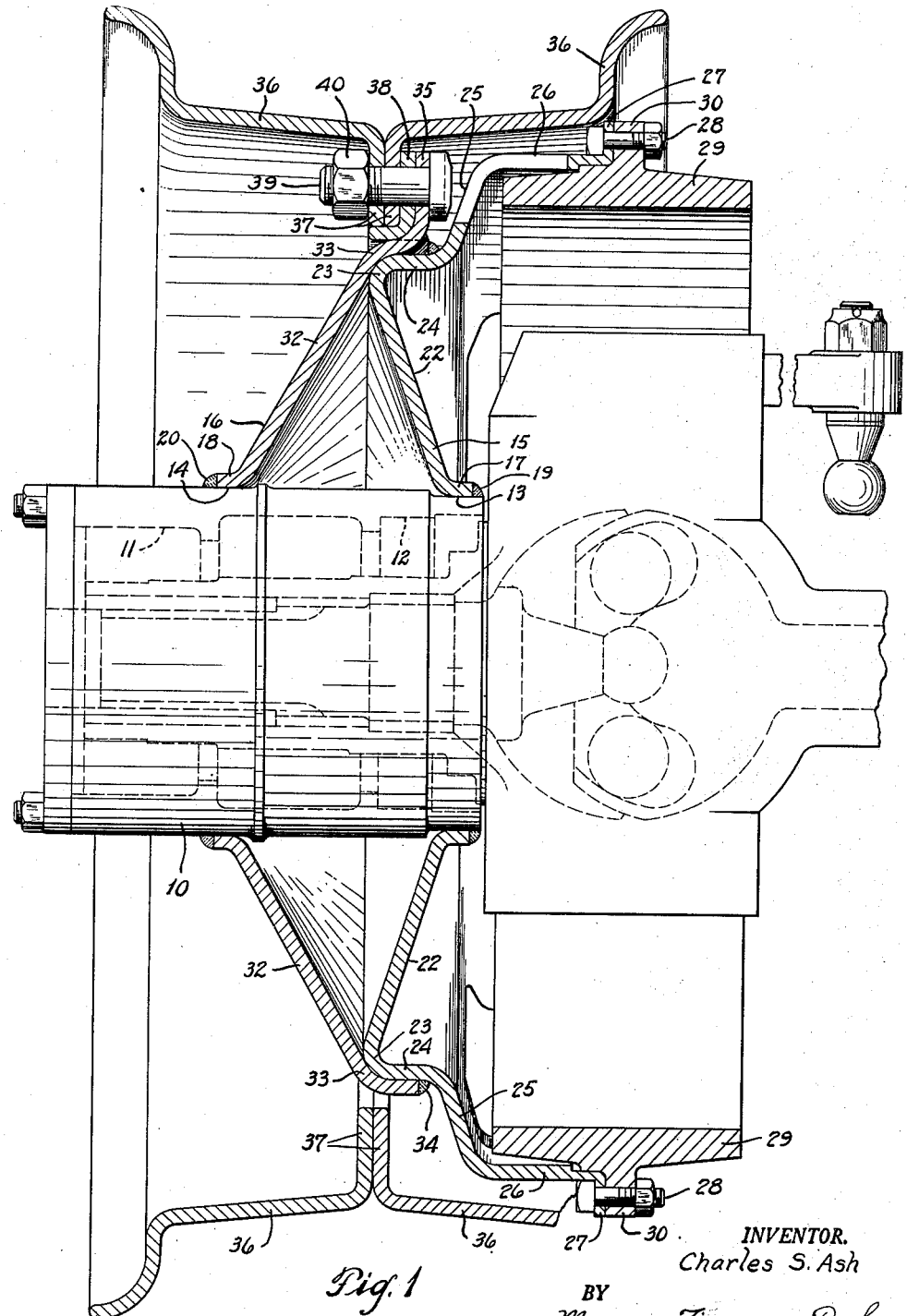
Fig. 1 is a cross-sectional view of a vehicle wheel in which the present invention is embodied.

Referring now in detail to the illustrative embodiment of the invention shown by way of example in the accompanying drawings, and referring first to the embodiment of Figs. 1 and 2, the wheel is shown as comprising a tubular hub 10 having bearing seats 11 and 12 to receive suitable anti-friction bearings whereby the hub may be rotatably mounted on either the front or rear axle of a vehicle.

The hub 10 is provided with a finished cylindrical seat 13 at its axially inner end and another finished seat 14 of considerable extent nearer its axially outer end, and on these seats the inner and outer cooperating web members 15 and 16 respectively are adapted to be press fitted in fabricating the wheel. The web members 15 and 16 are preferably conveniently and economically formed by pressing operation upon flat blanks of material and, as shown, are formed with inner peripheral short cylindrical portions 17 and 18 respectively to seat on the finished outer surfaces of hub 10 as described. The webs are secured to the hub by circular lines of welding 19 and 20 at the ends of portions 17 and 18 respectively.

Directly radially outwardly of the hub the inner web member is formed in an axially outwardly inclined frusto-conical portion 22 which, at its outer radial extent, is abruptly axially inwardly turned at 23 merging into a short cylindrically extending portion 24. Portion 24 is turned into a frusto-conically extending portion 25 which merges into a cylindrical portion 26 formed at its inner end in a flange 27. To the flange is removably connected by means of bolts 28 a cylindrical brake drum 29 at its central flange 30.

The outer web member 16 radially outwardly of portion 18 is formed in a frusto-conical portion 32 which converges on inner web member 15 and terminates in a curved portion 33 which overlaps the inner web at the curve 23 and the cylindrically extending portion 24. The webs are securely joined at their overlapping positions by arcuate welds 34.

At a plurality of circumferentially spaced places the curved portion 33 of the outer web is interrupted and formed in radially outwardly extending tabs 35 which serve as rim receiving and attaching means for the wheel. As shown, a split rim construction is utilized to conveniently demountably mount a tire of large cross-section and relatively small internal diameter, the rim comprising the duplicate rim halves 36 provided with inwardly radially extending attaching flanges 37. The rim halves 36 are adapted to abut at their flanges 37 and to be received by mounting lugs 38 of L cross-section as shown, and the mounting lugs are seated against the curved portion 33 and tabs 35 of the outer web 16. The tabs, mounting lugs and rim half flanges are correspondingly apertured to receive mounting bolts 39 to cooperate with nuts 40 in demountably mounting the rim and its tire on the wheel.

In the embodiment of the invention shown in Fig. 3 of the drawings the hub 10 is provided with modified web formations and the wheel is again adapted to receive the rim halves 36 and is provided with a cylindrical type brake drum 29.

As shown, the inner web member 45 is formed with an inner peripheral short cylindrical portion 46 press fitted on the exterior of the hub and welded thereto by circular weld 47. The web is formed in a frusto-conical portion 48 which merges into an abruptly axially inwardly turned portion 49, and the web in this case terminates at this place.

The outer web member 50 similarly has an inner peripheral turned portion 51 press fitted on the hub and welded at 52. The web is formed in a frusto-conical portion 53 which converges on the inner web and has a curved annular portion 54 cooperatingly formed with respect to curved portion 49, so that the former abuts and overlaps the latter, and is welded thereto by a circular weld 55.

In the presently considered embodiment of the invention the mounting ring to receive the rim-half flanges 37 comprises an L cross-section portion 56 similar in function to the lug members 38 in the embodiment of the invention already described, but in this case the L portion is formed integrally with a cylindrically extending portion 57 flanged at its axially inner end at 58 to removably receive the brake drum 29. The parts are again apertured as shown to receive mounting bolts 59 to receive nuts 40.

The embodiment of the invention shown in Fig. 4 of the drawings is also adapted to demountably mount a rim of broad channel and relatively small diameter, but in this embodiment the rim 62 is of conventional form having an inclined edge surface 63 for side mounting on the wheel and a removable ring or tire flange 64 whereby the tire casing may be conveniently removed.

An inner web member 65 is provided formed with a turned inner peripheral portion 66 which is press fitted on a finished external surface of a hub 67 and welded in a circular weld 68. The web 65 is formed in an axially outwardly flaring frusto-conical portion 69 adjacent the hub and is centrally reversely curved at 70 merging into an axially inwardly flared frusto-conical portion 71 which constitutes the radially outer portion of the web. The portion 71 at its outer periphery merges into an integral axially inwardly extending cylindrical portion 72 which is flanged at 73 to abut the central mounting flange 30 of a brake drum 29, being secured thereto by bolts 28.

The outer web member 75 of the fabricated wheel of this embodiment of the invention comprises the inner peripheral portion 76 press fitted on the hub 67 and welded as at 77. The web has a radially inner frusto-conical portion 78 which converges on the inner web 65 and is adapted to centrally overlap said web at a relatively short extent of its frusto-conical portion 71 adjacent the central turned portion 70. Frusto-conical portion 78 of outer web 75 merges in a curve 79 into a reversely flared frusto-conical portion 80 of relatively short extent which is then turned into a plurality of plane, radially extending portions 81. An annular frusto-conical portion 82 is formed at the outer periphery of the web to provide an outer inclined seat to receive in wedging relationship the inclined surface 63 of rim 62. The plane portions 81 of the outer web provide a place for mounting bolts 83 to be received in suitable apertures and a seat for lugs 84 cooperating therewith to demountably mount the rim on the wheel. The wheel webs 65 and 75 are securely welded together in a circular weld 85 in the tapering channel between the portions 71 and 79 of the respective webs.

As shown in Figs. 4 and 5, the web member 75 is provided with an interrupted place 86 in its outermost frusto-conical portion 82 in order to accommodate a valve stem of the tire inner tube. Driving lugs 88 secured to the inner surface of rim 62 are also received in the interrupted place 86 and afford a positive driving connection between the wheel and the rim mounted thereon.

Figure 6:
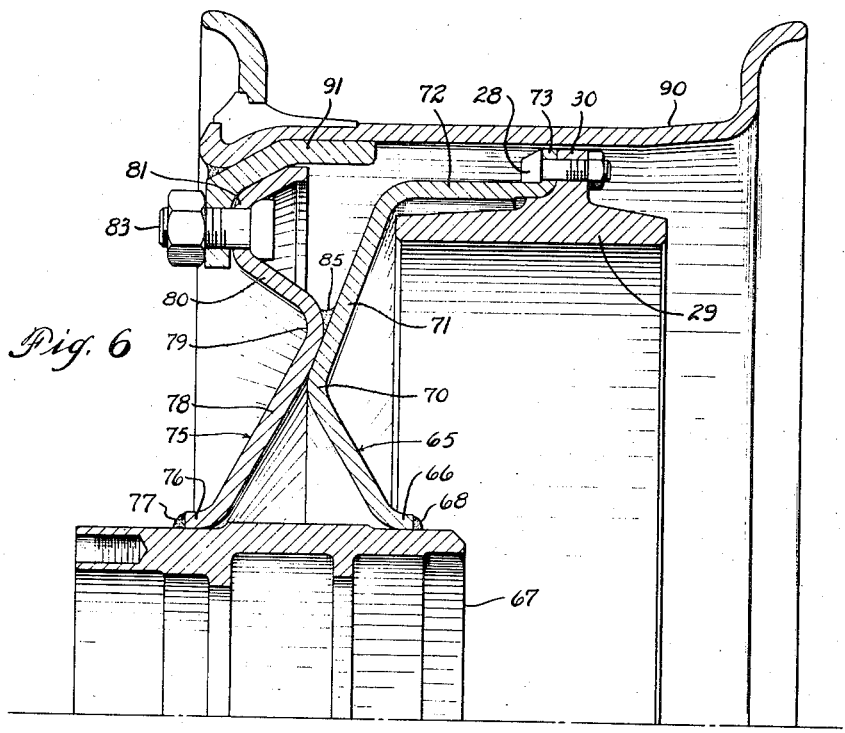
Fig. 6 is a fragmentary cross-sectional view of the wheel shown in Figs. 4 and 5 illustrating a slightly modified rim attaching means.
Figure 7:
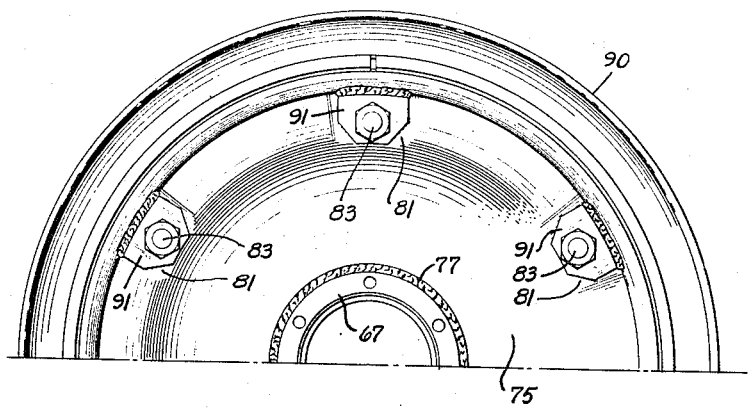
Fig. 7 is a side elevation of the wheel shown in Fig. 6 from the outboard side of the wheel.

In the embodiment of the invention shown in Fig. 6 of the drawings the wheel construction is identical with that just described for the embodiment of the invention shown in Figs. 4 and 5 of the drawings, the illustration serving to show that a rim 90 of the type having attached lugs 91 may be interchangeably mounted on the wheel.

In the invention thus shown and described it will be apparent that the webs, rims, rim mounting rings where used, and brake drum mounting means may each be economically and easily formed by pressing operation and assembled into a strong, fabricated wheel adapted for use at any position on a vehicle, and of the type adapted to receive large cross-sectional area tires of relatively small diameter.

The invention in its broader aspects is not limited to the specific mechanisms shown and described but departures may be made therefrom, within the scope of the accompanying claims, without departing from the principles of the invention and without sacrificing its chief advantages.

What I claim is:

1. A vehicle wheel comprising, in combination, a tubular hub, a pair of webs secured to the hub in spaced relationship said webs converging toward each other and abutting at annular portions thereof a substantial distance radially outwardly from said hub, the inner of said webs being axially turned in a substantially cylindrical portion adjacent its said annular abutting portion and merging into a radially extending portion which merges into a second substantially cylindrical portion, a brake drum removably secured to said second cylindrical portion, the outer of said webs having a cylindrical portion adjacent its said annular abutting portion overlapping and abutting said first cylindrical portion of said inner web, said outer web cylindrical portion merging into circumferentially spaced, radially extending tab portions, a tire rim, and means for removably mounting said rim on said tab portions.

2. A vehicle wheel as set forth in claim 1 wherein said rim comprises a pair of rim halves having radially inwardly extending flanges adapted to be removably secured to said tab portions.

3. A vehicle wheel as set forth in claim 1 wherein said rim comprises at least one radially inwardly extending flange, and said mounting means comprises a mounting lug of L-shaped cross section for each said tab portion adapted to be seated thereagainst and upon said cylindrical portion of said outer web and to receive said rim flange.

4. A vehicle wheel as set forth in claim 1 wherein said webs are formed in their converging extents adjacent said hub as similarly shaped and oppositely facing frusto-conical portions, and said rim comprises at least one radially inwardly extending flange centrally located with respect to the rim, said flange being positioned to surround said annular abutting portions of said webs when said rim is mounted on said tab portions.

CHARLES S. ASH.

REFERENCES CITED

The following references are of record in the file of this patent:

UNITED STATES PATENTS

| Number | Name | Date |
|---|---|---|
| 1,577,158 | Barber | Mar. 16, 1926 |
| 1,664,765 | Ash | Apr. 3, 1928 |
| 1,686,509 | Barber | Oct. 9, 1928 |
| 1,985,054 | Nelson | Dec. 18, 1934 |
| 2,265,938 | Eksergian | Dec. 9, 1941 |

FOREIGN PATENTS

| Number | Country | Date |
|---|---|---|
| 447,510 | Germany | 1927 |
| 172,546 | Switzerland | 1935 |
| 358,992 | Italy | May 11, 1938 |